(12) United States Patent
Kudo et al.

(10) Patent No.: US 8,403,013 B2
(45) Date of Patent: Mar. 26, 2013

(54) PNEUMATIC TIRE

(75) Inventors: Shigeo Kudo, Osaka (JP); Osamu Fujiki, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 398 days.

(21) Appl. No.: 12/439,622

(22) PCT Filed: Mar. 15, 2007

(86) PCT No.: PCT/JP2007/055275
§ 371 (c)(1),
(2), (4) Date: Mar. 2, 2009

(87) PCT Pub. No.: WO2008/026337
PCT Pub. Date: Mar. 6, 2008

(65) Prior Publication Data
US 2010/0012242 A1   Jan. 21, 2010

(30) Foreign Application Priority Data

Aug. 31, 2006 (WO) .................. PCT/JP2006/317194

(51) Int. Cl.
*B60C 19/08* (2006.01)
(52) U.S. Cl. ............... 152/209.5; 152/209.1; 152/152.1; 156/117; 156/130
(58) Field of Classification Search ............. 152/152.1, 152/209.1, 209.5, DIG. 2; 156/117, 130
See application file for complete search history.

(56) References Cited

U.S. PATENT DOCUMENTS

2006/0042737 A1* 3/2006 Hayashi et al. ............. 152/209.1
2007/0017615 A1* 1/2007 Nobuchika et al. ........ 152/152.1

FOREIGN PATENT DOCUMENTS

| EP | 875366 A2 | 4/1998 |
| JP | 10-323917 A | 12/1998 |
| JP | 11-227415 A | 8/1999 |
| JP | 2004-338621 A | 12/2004 |
| JP | 2007-008388 A | 1/2007 |

OTHER PUBLICATIONS

International Search Report of PCT/JP2007/055275; Mailing Date of Jun. 19, 2007.

* cited by examiner

*Primary Examiner* — Katarzyna Wyrozebski Lee
*Assistant Examiner* — Carson Gross
(74) *Attorney, Agent, or Firm* — Westerman, Hattori, Daniels & Adrian, LLP

(57) ABSTRACT

An object is to provide a pneumatic tire which can exhibit a static elimination function in an ensured fashion and be fabricated easily. As a means therefor, there is provided a pneumatic tire in which a conductive layer 12*a* and a non-conductive layer 14*a* are wound alternately in a tire circumferential direction in a partially overlapping fashion at least in part of a tread portion, characterized in that the conductive layer 12*a* is provided wider than the non-conductive layer 14*a*.

2 Claims, 7 Drawing Sheets

PNEUMATIC TIRE

TECHNICAL FIELD

The present invention relates to a pneumatic tire having a static elimination function.

BACKGROUND ART

In general, tires are configured in such a manner as to include a plurality of tire rubber members and a plurality of reinforcement members which are mainly made up of cords. In a representative tire, as is shown in FIG. 7, respective portions such as an inner liner portion 51, a tread portion 52, side wall portions 53, rim strip portions 54 and the like are formed by rubber members which match properties required for the respective portions and these rubber members are combined with a carcass layer 55 which constitutes a cord-contained reinforcement member, a belt layer 56 and bead portions 57 to thereby make up a tire T2.

To build rubber members which make up the respective portions, rubber materials were extruded continuously to be built into rubber strips from an extruding machine via dies which match cross sectional shapes of the respective rubber members, and thereafter, the rubber strips so built were cut to constant dimensions to thereby obtain target rubber members. In building a tire, the rubber members were sequentially affixed together on a rotational support element such as a building drum.

In addition, in recent years, in order to reduce the rolling resistance of a tire, tread rubbers have been developed which use silica instead of carbon black as a strengthening agent. However, since the tread rubbers have an electric resistance which is higher than that of tread rubbers which is compounded with only carbon black, there has been caused a problem that static electricity conducted from a vehicle body or electricity generated by internal friction when rubber deforms is accumulated. Then, there have been proposed pneumatic tires with a static elimination function which are made up in parallel of a non-conductive rubber which contains silica or the like and a conductive rubber which is compounded with carbon black or the like so that electricity generated in the vehicle body is made to be discharged to the road surface from a tread surface thereof.

For example, there has been proposed a pneumatic tire with a static elimination function in which a tread portion is configured by winding sequentially both a non-conductive rubber strip member and a highly conductive rubber strip member along a circumferential direction of a tire in a spiral fashion in such a manner that the non-conductive rubber strip member and the highly conductive rubber strip member are disposed in an alternate fashion (for example, refer to Patent Document No. 1 below).

However, in the pneumatic tire, there is caused a fear that the non-conductive rubber strip material covers the highly conductive rubber strip material in the tread portion to thereby exhibit no static elimination function unless winding positions of the non-conductive rubber strip material and the highly conductive rubber strip material are adjusted with good accuracy. Moreover, in the event that the tread portion is formed such as a winding drum by a roller, the non-conductive rubber in the rubber strip material is pressed to expand to cover the conductive rubber during the pressing step, causing the fear that the static elimination function is not exhibited. In addition, at the time of processing a green tire under vulcanization, as with the aforesaid pressing step, the non-conductive rubber flows to cover the conductive rubber, leading to the fear that the static elimination function is not exhibited.
Patent Document No. 1: JP-A-2004-338621

SUMMARY OF THE INVENTION

Problem that the Invention is to Solve

The invention has been made in view of the problem, and an object thereof is to provide a pneumatic tire which can exhibit the static elimination function in an ensured fashion and moreover which can easily be fabricated.

Means for Solving the Problem

The invention provides a pneumatic tire in which a conductive layer and a non-conductive layer are wound alternately in a tire circumferential direction in a partially overlapping fashion at least in part of a tread portion, characterized in that the conductive layer is provided wider than the non-conductive layer.

In the invention, the non-conductive layer may be a rubber strip material made of a non-conductive rubber, and the conductive layer may be a rubber strip material made of a conductive rubber. Furthermore, the conductive layer and the non-conductive layer are made up, respectively, of a conductive rubber layer made of a conductive rubber and a non-conductive layer made of a non-conductive rubber, and the conductive layer and the non-conductive layer may integrally be laminated into a rubber strip material.

According to the invention, in the conductive layer and the non-conductive layer which make up the tread portion, since the conductive layer is provided wider than the non-conductive layer, the conductive layer is provided on a surface of the tread portion, whereby the static elimination function is allowed to be exhibited in an ensured fashion. In addition, when the conductive layer and the non-conductive layer are folded back to form the tread portion, the conductive layer can be made to intersect itself at an interface so that the conductive layer is brought into contact with itself, whereby the static elimination function can be exhibited in an ensured fashion.

Advantage of the Invention

According to the invention, since the adjacent conductive layers can be brought into contact with each other in the ensured fashion, the pneumatic tire with the static elimination function can easily be fabricated.

DETAILED DESCRIPTION OF THE INVENTION

Hereinafter, a first embodiment of the invention will be described based on the drawings.

Figure 1:
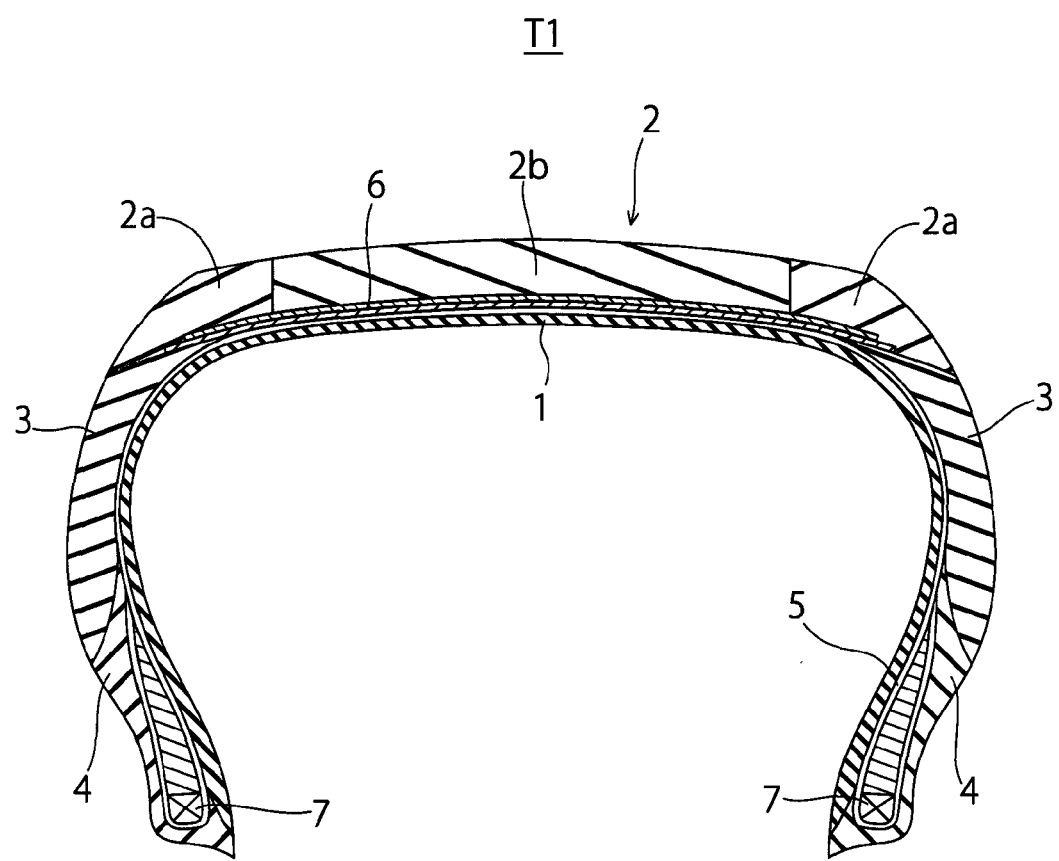
FIG. 1 A sectional view showing a pneumatic tire according to an embodiment of the invention.
Figure 2A:
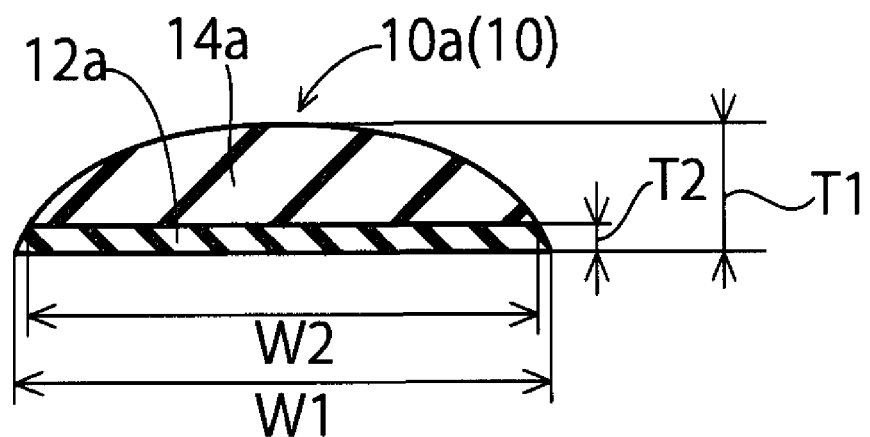
FIG. 2A A sectional view of a rubber strip material employed in a fabrication method according to the embodiment.
Figure 2B:
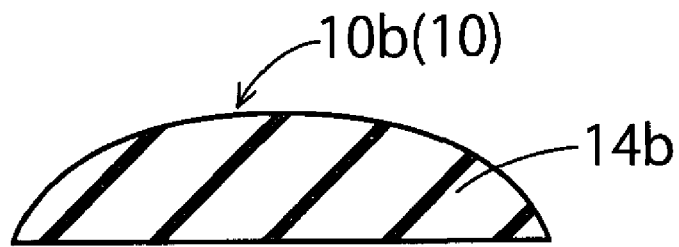
FIG. 2B A sectional view of a rubber strip material employed in a fabrication method according to the embodiment.

FIG. 1 is a sectional view showing an example of a pneumatic tire T1 according to the embodiment, and FIG. 2A,2B shows sectional views of rubber strip members 10 which make up a tread portion 2 of the pneumatic tire T1.

A pneumatic tire (hereinafter, referred to as a tire) T1 according to the embodiment includes, for example, as is shown in FIG. 1, a pair of bead portions 7, rim strip portions 4 and side wall portions 3 which extend radially outwards of the tire from the bead portions 7, respectively, and a tread portion 2 which is provided between the side wall portions 3, and a carcass layer 5 which is made up of carcass plies establishes a reinforcement between the bead portions 7. An inner liner portion 1 and a belt layer 6 in which two internal and external belt plies are laminated together are provided, respectively, on an inner circumference and an outer circumference of the carcass layer 5 so as to hold an air pressure.

The tread portion 2 is made up of shoulder portions 2a, 2a which are provided on both sides in a tire width direction and a tread central portion 2b which is provided between both the shoulder portions 2a, 2a, and the shoulder portions 2a and the tread central portion 2b are built by a rubber strip member 10 being wound in an overlapping fashion.

This rubber strip member 10 is formed into a ribbon shape having a flat cross sectional shape such as a substantially crescent shape, a flat substantially triangular shape or a flat substantially trapezoidal shape in which mainly a widthwise central portion is made thickest and the thickness is gradually reduced from this central portion towards both sides.

To describe in greater detail, in a rubber strip member 10a which makes up the shoulder portions 2a, 2a, as is shown in FIG. 2A, a conductive layer 12a made of a conductive rubber material and a non-conductive layer 14a made of a non-conductive rubber material are laminated integrally, and the conductive layer 12a and the non-conductive layer 14a are provided in such a manner that a width dimension W1 of the conductive layer 12a becomes wider than a width dimension W2 of the non-conductive layer 14a. On the other hand, a rubber strip member 10b which makes up the tread central portion 2b is made up of a non-conductive rubber layer 14b only which is made up of a non-conductive rubber material shown in FIG. 2B, and does not have a conductive rubber layer made of a conductive rubber material.

An example of a rubber strip material 10 which is used in this embodiment will be described by reference to FIG. 2A. A cross section of the rubber strip material 10 has a substantially crescent shape having a thickness dimension T1 of 0.5 to 30 mm, and the width dimension W1 of the conductive layer 12a of the rubber strip material 10a becomes 5 to 50 mm and a thickness dimension T1 thereof becomes 0.05 to 0.2 mm, while the width dimension W2 of the non-conductive layer 14a becomes 4 to 45 mm. In addition, although the dimensions and shape of the rubber strip is not specifically limited to those described above, the cross sectional shape is preferably small from the viewpoint of dimensional accuracy of the tread portion and weight balance and uniformity of the tire.

Here, the conductive rubber material which makes up the conductive rubber layer denotes a conductive rubber compound having a specific volume resistance of less than $10^8 \Omega \cdot cm$, and for example, a rubber compound can be raised as an example which contains much carbon black as a strengthening agent. The conductive rubber material can be obtained by compounding, other than carbon black, a predetermined amount of a known conductivity imparting material such as a carbon-based material including carbon fiber, graphite or the like and a metal-based material including metallic powder, metallic oxide, metallic flakes, metallic fiber or the like. In addition, the non-conductive rubber material which makes up the non-conductive rubber layer denotes a non-conductive or insulating rubber compound having a specific volume resistance of $10^8 \Omega \cdot cm$ or more, and for example, a rubber compound can be raised as an example which is compounded with, in place of carbon black, silica in a high proportion as the strengthening agent. The non-conductive rubber of this embodiment is such as to contain 40 to 100% of silica by weight ratio.

Next, a building method of the tread portion 2 of the tire T will be described.

Figure 3:
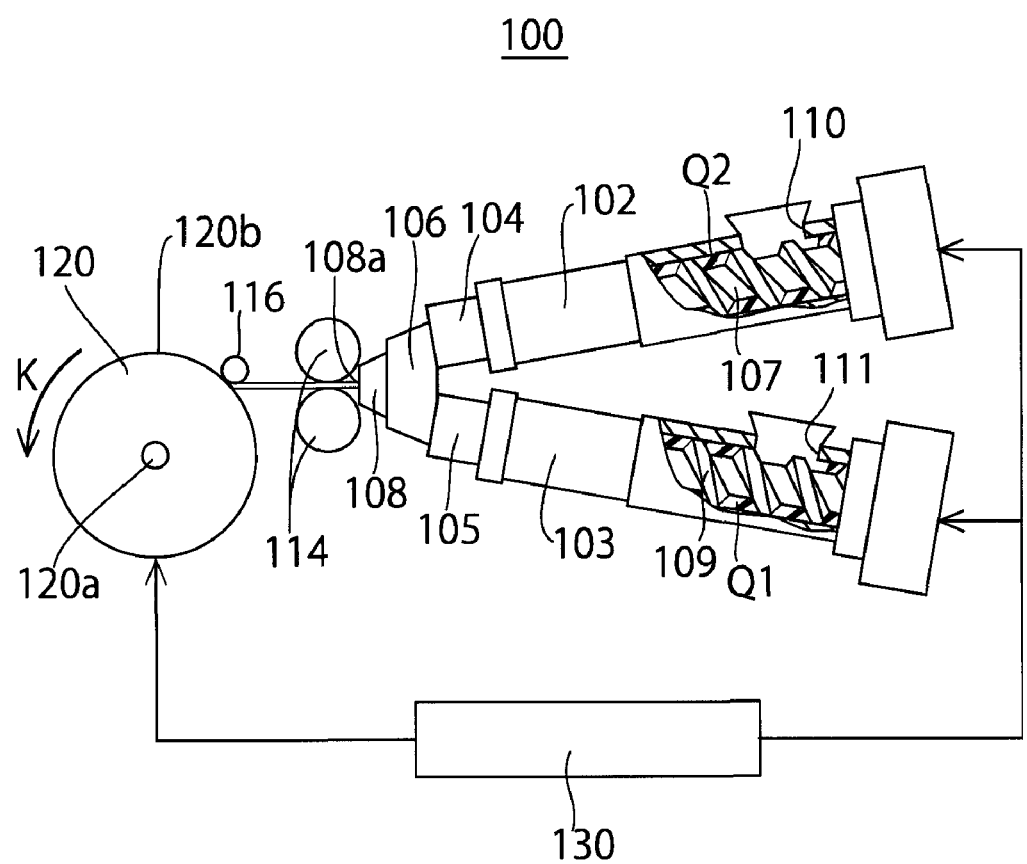
FIG. 3 A drawing explaining a method for building a tread portion by winding a rubber strip material which is extruded by an extruding machine.
Figure 4:
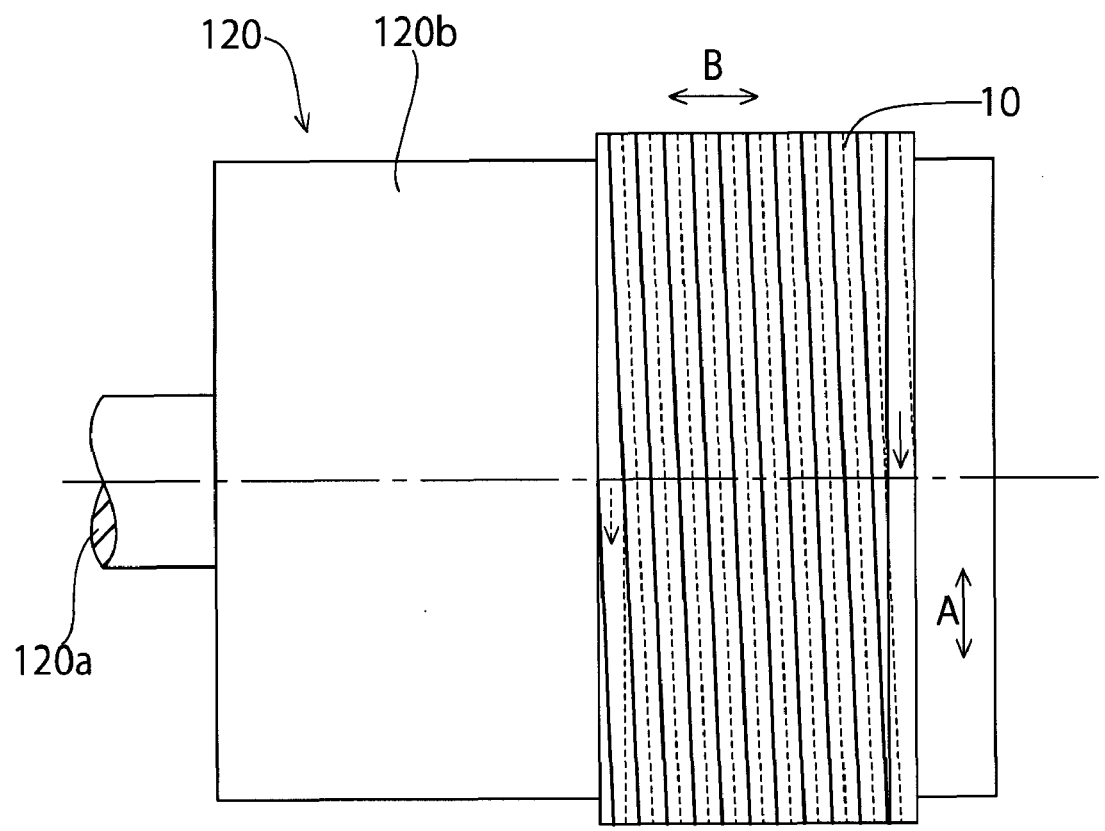
FIG. 4 A plan view explaining a winding method of the rubber strip material.
Figure 5:
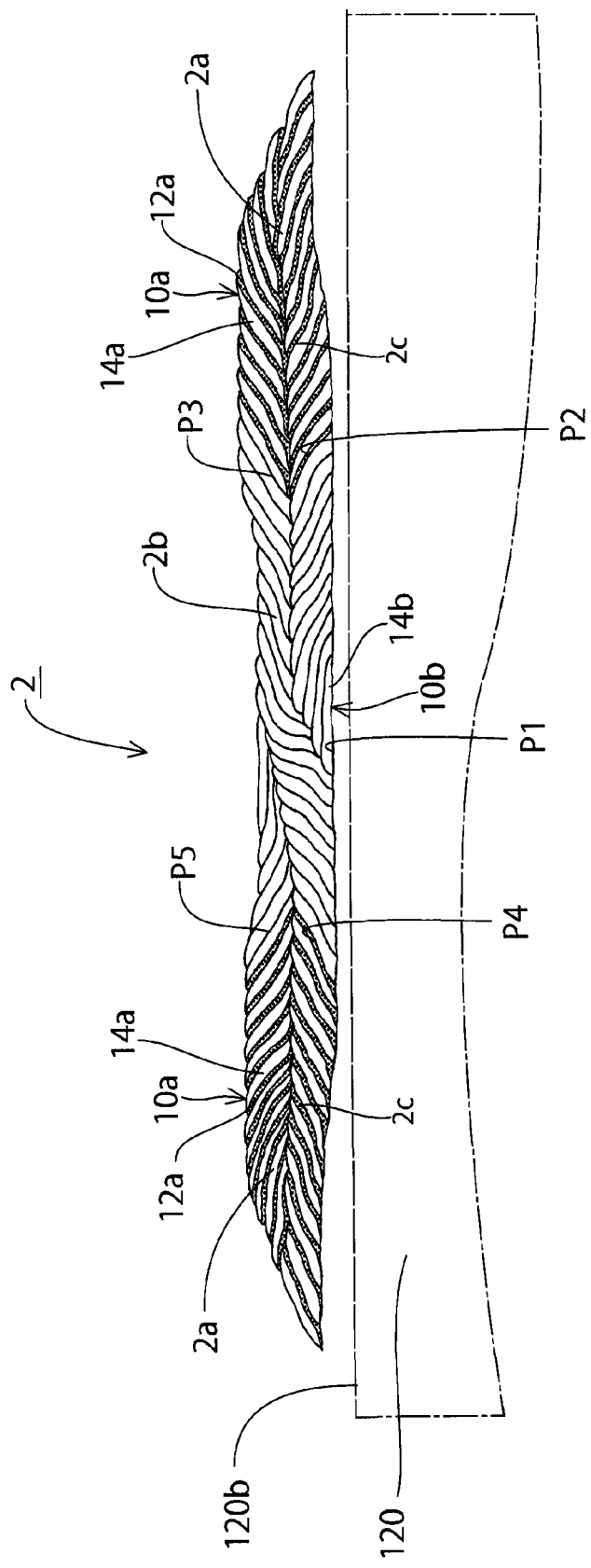
FIG. 5 A sectional view showing a method for building a tread portion by employing the rubber strip materials.

FIG. 3 is a drawing explaining a method for building the tread portion 2 by winding a rubber strip member 10 which is extruded by an extruding machine 100, FIG. 4 is an exemplary drawing explaining a method for winding the rubber strip member 10 on to a rotational support element 120, and FIG. 5 is a sectional view showing a method for building the tread portion 2 by the use of the rubber strip member 10.

In a fabricating process of the tire T, the tread portion 2 of the tire T is formed by winding the rubber strip member 10 which is extruded from the extruding machine 100 as shown in FIG. 3 on to the rotational support element 120 such as a building drum or a green tire (not shown) which is supported at bead portions.

To describe in detail, the extruding machine 100 which extrudes the rubber strip member 10 includes, as is shown in FIG. 3, a pair of main body cases 102, 103 which are each formed into a cylindrical shape and in which rubber feeding screw shafts 107, 109 are provided respectively in interiors thereof, a pair of head portions 104, 105 which have gear pumps which are provided consecutively to distal ends of the main body cases 102, 103, respectively, a rubber coalescence portion 106 provided in common at distal ends of the head portions 104, 105 and an extruding die 108 which is added to a distal end of the rubber coalescence portion 106, so that a non-conductive rubber material Q2 is made to be supplied into an interior of the main body case 102 from a hopper 110 and a conductive rubber material Q1 is made to be supplied into an interior of the main body case 103 from a hopper 111. Both the rubber materials Q1, Q2 which are so supplied to the main body cases 102, 103 are fed forwards by virtue of rotation of the screw shafts 107, 109, respectively, and are then fed to the rubber coalescence portion 106 by the gear pumps of the head portions 104, 105 in such a manner as to realize required flow rates.

At the rubber coalescence portion 106, the rubber material Q1 and the rubber material Q2 are formed into shapes which correspond, respectively, to the conductive layer 12a and the non-conductive layer 14a and are then coalesced together, whereby a ribbon-shaped rubber strip member 10a in which a conductive rubber layer 12a and a non-conductive layer 14a are laminated integrally as is shown in FIG. 2a is continuously extruded via the extruding die 108 whose discharge port 108a is formed into a shape matching the cross sectional shape of the rubber strip material 10.

In the extruding machine 100 configured as described above, by stopping the operations of the screw shaft 109 in the main body case 103 into which the conductive rubber material Q1 is supplied and the gear pump 105 from a working state in which the rubber strip member 10a is extruded and controlling the screw shaft 107 in the other main body case 102 into which the non-conductive rubber material Q2 is supplied and the gear pump 104 in such a manner as to realize a predetermined flow rate of the rubber material which is fed to the rubber coalescence portion 106, a rubber strip member 10b which is made up of only a non-conductive rubber layer 14b is continuously extruded from the extruding machine 100 without stopping the operation of the extruding machine 100. On the other hand, by causing the screw shaft 109 in the main body case 103 and the gear pump 105 of the extruding machine 100 which have been stopped from rotating from the working state in which the rubber strip material 10b is extruded to rotate at a predetermined speed and controlling the screw shaft 107 in the other main body case 102 into which the non-conductive rubber material Q2 is supplied and the gear pump 104 to reduce their rotational speeds in such a manner as to realize the predetermined flow rate of the rubber material which is fed to the rubber coalescence portion 106, the rubber strip member 10a whose cross section is made up of the conductive layer 12a and the non-conductive layer 14a which are laminated integrally is continuously extruded without stopping the operation of the extruding machine 100.

In this way, the extruding machine 100 can extrude the two types of rubber strip materials 10a, 10b while switching therebetween at an arbitrary timing without stopping the operation of the extruding machine 100 by controlling the flow rates of the conductive rubber material Q1 and the non-conductive rubber material Q2 which are fed to the rubber coalescence portion 106.

The rubber strip materials 10a, 10b which are extruded in the way described above are then wound on to the rotational support element 120 which is disposed in such a manner as to confront the extruding machine 100 via rolls 114 which introduce the rubber strip materials 10a, 10b which are each extruded into a ribbon shape having a predetermined cross sectional shape from the extruding machine 100 to the rotational support element 120 while shaping properly the cross sectional shapes of the rubber strip materials 10a, 10b. The rotational support element 120 can rotate about a shaft 120a, and the rubber strip members 10a, 10b are wound along a tire circumferential direction while rotating the rotational support element 120 in a direction indicated by an arrow K in FIG. 3. The rubber strip materials 10a, 10b which are so wound on to the rotational support element 120 are pressed against a winding surface 120b of the rotational support element 120 by a roller 116.

Figure 6:
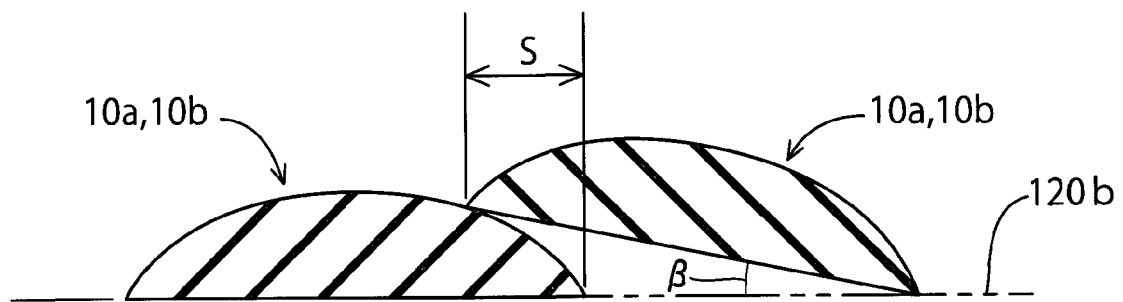
FIG. 6 A sectional view showing a method of winding the rubber strip materials.
Figure 7:
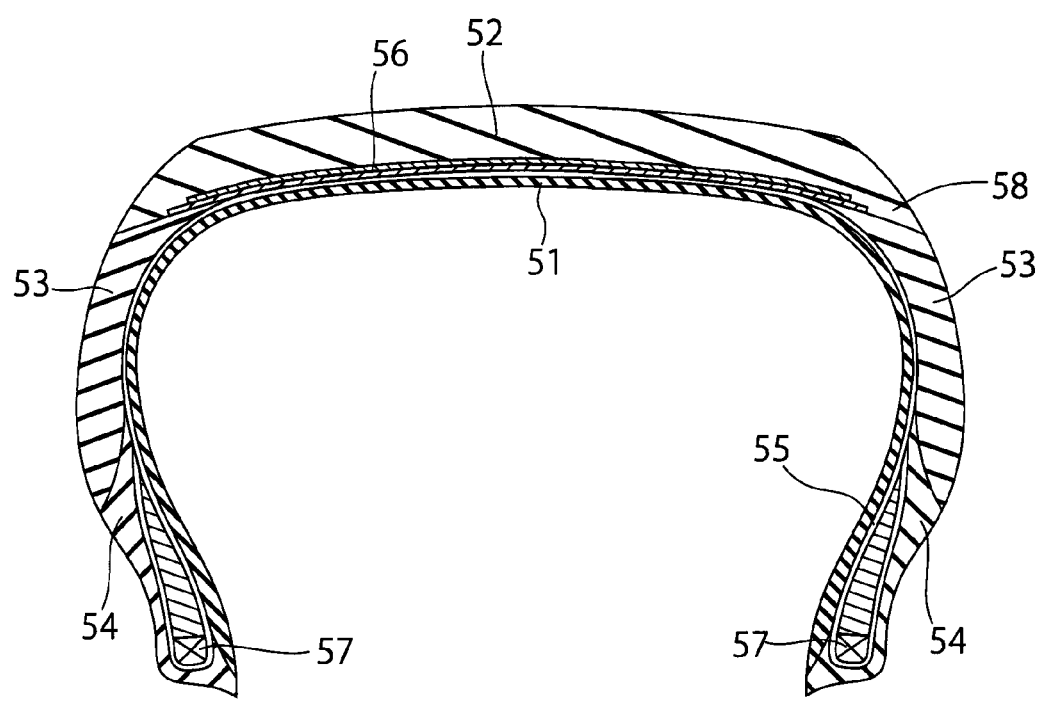
FIG. 7 A sectional view showing an example of a conventional pneumatic tire.

FIG. 4 is a view resulting when the rotational support element 120 of the building drum is viewed thereabove, and an arrow A denotes the tire circumferential direction, and an arrow B denotes a tire width direction (axial direction). When winding spirally the rubber strip materials 10a, 10b along the tire circumferential direction, not only by rotating the rotational support element 120 but also by shifting either the extruding machine 100 or the rotational support element 120 along the tire width direction so as to relatively shift the extruding machine 100 along the tire width direction B, the adjacent rubber strip materials 10a, 10b are wound in a partially overlapping fashion. As this occurs, as is shown in FIG. 6, by controlling the relative shifting speed in the tire width direction B, an overlapping amount S between the adjacent rubber strip materials is adjusted, so as to control an inclination angle β of the rubber strip materials 10a, 10b relative to the winding surface 120b of the rotational support element 120 in such a manner as to become a predetermined value.

The operations of the extruding machine 100 and the rotational support element 120 are controlled by a control unit 130.

In building the tread portion 2 on a belt portion 6 formed on the winding surface 120b of the rotational support element 120 by the use of the extruding machine 100 constituted as described above, firstly, by controlling the screw shaft 107 in the other main body case 102 into which the non-conductive rubber material Q2 is supplied and the gear pump 104 in such a manner as that the rubber material is fed to the rubber coalescence portion 106 at the predetermined flow rate, as is shown in FIG. 5, the rubber strip material 10b is extruded by the extruding machine 100, and the rubber strip material 10b so extruded is wound on to the rotational support element 120 while shifting the rubber strip material 10b from a winding starting position P1 at a central portion of the rotational support element 120, which corresponds to a central portion of the tread portion 2, towards one end portion (for example, a right end portion) in the tire width direction.

Following this, when the rubber strip material 10b reaches a position P2 which corresponds to the shoulder portion 2a, from the midst of the winding operation of the rubber strip material 10b, the screw shaft 109 in the man body case 103 into which the conductive rubber material Q1 is supplied and the gear pump 105 of the extruding machine 100 are caused to rotate at a predetermined speed, while the screw shaft 107 in the other main body case 102 into which the non-conductive rubber material Q2 is supplied and the gear pump 105 are controlled to reduce their rotational speeds in such a manner that the predetermined flow rate of the rubber material that is fed to the rubber coalescence portion 106 is realized. By controlling the extruding machine 100 in the way described above, the rubber strip material 10a is extruded from the extruding machine 100 without any interruption so as to be supplied to the rotational support element 120, and when the rubber strip material 10a reaches a right end, the rubber strip material 10a is folded to a tire outer circumferential side, so as to continue to be wound while being shifted from the right end towards the other end portion (a left end portion) in the tire width direction, whereby the shoulder portion 2a of the tread portion 2 is built. In the shoulder portion 2a so formed, since the spiral direction becomes opposite before and after where the rubber strip portion 10a is folded back, there is produced a portion where the rubber strip material 10a intersects itself. At this intersecting portion, by the conductive layer 12a of the rubber strip member 10a being brought into contact with itself as a result of the rubber strip member 10a being so folded back, a conductive path 2c is formed for releasing static electricity from a belt layer 6 lying underneath the tread portion 2 to the surface of the tread.

Following this, when the rubber strip material 10a reaches a position P3 which corresponds to the tread central portion 2b, from the midst of the winding operation of the rubber strip material 10a, the screw shaft 109 in the main body case 103 into which the conductive rubber material Q1 is supplied and the gear pump 104 of the extruding machine 100 are stopped from operating, while the screw shaft 107 in the other main body case 102 into which the non-conductive rubber material Q2 is supplied and the gear pump 104 are controlled in such a manner that the predetermined flow rate of the rubber material that is fed to the rubber coalescence portion 106 is realized. By controlling the extruding machine 100 in the way described above, a rubber strip member 10b is extruded from the extruding machine 100 without any interruption so as to be supplied to the rotational support element 120, and the rubber strip member 10b is wound on to the rotational support element 120 while being shifted leftwards towards the left end portion, so that the tread central portion 2b of the tread portion 2 is built.

Following this, when the rubber strip material 10b reaches a position P4 which corresponds to the shoulder portion 2a, from the midst of the winding operation of the rubber strip material 10b, by controlling the extruding machine 100 in such a manner that the screw shafts 107, 109 and the gear pumps 104, 105 are caused to rotate at the predetermined speeds in the way described above so as to realize predetermined flow rates of the rubber materials Q1,Q2 which are fed to the rubber coalescence portion 106, a rubber strip material 10a is extruded from the extruding machine 100 so as to be supplied on to the rotational support element 120 and is wound on thereto while being shifted from the right to the left. When the rubber strip material 10a reaches the left end, the rubber strip material 10a is folded towards the tire outer circumferential side, so as to continue to be wound while being shifted from the left to the right, whereby the shoulder portion 2a of the tread portion 2 is built. As with what has been described above, in the shoulder portion 2a so built, in the portion where the rubber strip material 10a intersects itself, by the conductive layer 12a of the rubber strip material 10a being brought into contact with itself as a result of the rubber strip material 10a being so folded back, a conductive path 2c is formed for releasing static electricity from a belt layer 6 lying underneath the tread portion 2 to the surface of the tread.

Following this, when the rubber strip material 10a reaches a position P5 which corresponds to the tread central portion 2b, from the midst of the winding operation of the rubber strip material 10a, by controlling the extruding machine 100 in the way described above, a rubber strip material 10b is extruded from the extruding machine 100 so as to be supplied on to the rotational support element 120, and the rubber strip material 10b is wound while being shifted to the right, whereby the tread central portion 2b of the tread portion 2 is built. Thus, the tread portion 2 can be formed which includes the shoulder portions 2a which are made up of the conductive rubber material and the non-conductive rubber material and which are imparted the static elimination function and the tread central portion 2b which is made up of the non-conductive rubber material.

As has been described above, in the rubber strip material 10a which makes up the shoulder portions 2a, 2a, since the conductive layer 12a is provided wider than the non-conductive layer 14a, when the rubber strip material 10a is extruded from the extruding machine 100, the conductive rubber material Q1 can be made to flow through in the vicinity of both end portions of the discharge port 108a where controlling of the rubber material which flows therethrough is difficult, whereby the conductive rubber can be provided at both the end portions of the rubber strip material 10a at all times.

Because of this, even in the event that the rubber strip material 10a is pressed against by the roller 116 when the rubber strip material 10a is wound on to the winding surface 120b of the rotational support element 120, the conductive rubber which lies at both the end portions is pressed to be expanded, and hence, there is caused no such situation that the non-conductive rubber covers the conductive rubber, and since there is no possibility that the non-conductive rubber flows to cover the conductive rubber during vulcanization of a green time, the static elimination function can be made to be exhibited in an ensured fashion.

In addition, in the tire T1 of this embodiment, while the shoulder portions 2a, 2a of the tread portion 2 are made up of the rubber strip material 10a which is made up of the conductive layer 12a and the non-conductive layer 14a, the invention is not limited thereto, and hence, the whole area of the tread portion 2 may be made of the rubber strip material 10a which is made up of the conductive layer 12a and the non-conductive layer 14a.

Additionally, in the tire T1 of this embodiment, while the tread portion 2 is formed by the use of the rubber strip material 10a into which the conductive layer 12a made of the conductive rubber material and the non-conductive layer 14a made of the non-conductive rubber material are integrated, a conductive rubber strip material made of a conductive rubber material and a non-conductive rubber strip material made of a non-conductive rubber material may be wound on to the winding surface 120b while being laminated on the rotational support element 120.

Furthermore, a conductive layer may be formed on a surface of the non-conductive layer made of the non-conductive rubber strip material by applying a conductive liquid material. Namely, a conductive layer may be formed by applying a conductive liquid material to the surface of the non-conductive layer which is wound on to the winding surface 120b of the rotational support element 120 with a brush or a roller in such a manner that the conductive layer so applied becomes wider than the non-conductive layer, or by winding a non-conductive rubber strip material on the whole surface of which a conductive layer is formed by applying a conductive liquid material thereto on the building drum.

Here, there is no specific limitation on the conductive liquid material used, and any conductive liquid material can be used provided that the liquid material has superior adhesion to rubber and its conductivity is not damaged even when subjected to a vulcanization process. As such conductive liquid materials, for example, a rubber glue or cement can be raised which is mixed with a rubber compound which is compounded with carbon black in a high proportion.

With the conductive liquid material described above, even in the event that the liquid material is applied to the surface of a non-conductive rubber strip material while the viscosity thereof being adjusted as required so as to form a conductive layer thereon, a conductive layer can easily be formed wider than the non-conductive rubber strip material.

In addition, when a conductive layer is formed on the surface of a non-conductive rubber strip material, by applying a conductive liquid material while appropriately adjusting the viscosity thereof, at least part of the conductive liquid material so applied stays on the surface of the non-conductive rubber strip material, whereby a conductive layer can easily be formed wider than the non-conductive rubber strip material.

In this way, even when the conductive rubber strip material and the non-conductive rubber strip material are laminated one on the other, by providing the conductive rubber strip material wider than the non-conductive rubber strip material, the conductive rubber material can be made to be exposed, in an ensured fashion, to the surface of the rubber strip materials which are laminated without adjusting the positions of both the rubber strip materials with good accuracy, whereby the static elimination function can be exhibited in an ensured fashion.

DESCRIPTION OF REFERENCE NUMERALS AND CHARACTERS

1 . . . inner liner rubber portion
2 . . . tread rubber portion
2a . . . shoulder portion
2b . . . tread central portion 2c ... conductive path
3 ... side wall rubber portion
4 ... rim strip rubber portion
5 ... carcass layer
6 ... belt layer
7 ... bead portion
8 ... base rubber portion
10, 10a, 10b ... rubber strip material
12a ... conductive layer
14a ... non-conductive layer
14b ... non-conductive rubber layer
100 ... extruding machine

The invention claimed is:

1. A pneumatic tire having a tread portion formed by winding a rubber strip member in a tire circumferential direction partially, wherein the tread portion comprises:
   a first layer portion in which the rubber strip member is wound up to one end portion in a width direction of the tread portion from a central portion in a width direction thereof,
   a second layer portion in which the rubber strip member is wound up to another end portion in a width direction of the tread portion from the one end portion in a width direction thereof, and
   a third layer portion in which the rubber strip member is wound up to the central portion in a width direction of the tread portion from the other end portion in a width direction thereof, and
   the first layer portion, the second layer portion and the third layer portion are formed by the single continuous rubber strip member;
   the rubber strip member comprises:
   a non-conductive rubber strip member comprising a non-conductive rubber, and
   a laminated rubber strip member continuously provided on the non-conductive rubber strip member in a longitudinal direction;
   the laminated rubber strip member comprises:
   a non-conductive rubber layer comprising a non-conductive rubber, and a conductive rubber layer comprising a conductive rubber, provided wider than the non-conductive rubber layer and laminated on one surface of the non-conductive rubber layer, and
   the non-conductive rubber strip member is provided at the central portion in a width direction of the tread portion, and the laminated rubber strip member is provided at both end portions in a width direction of the tread portion.

2. The pneumatic tire as set forth in claim 1, wherein the conductive layer and the non-conductive layer are a conductive rubber layer comprising a conductive rubber and a non-conductive rubber layer comprising a non-conductive rubber, and the conductive rubber layer and the non-conductive rubber layer are integrally laminated to form a single rubber strip member.

* * * * *